Sept. 1, 1936.   L. O. CEDERWALL   2,053,064
AILERON CONTROL
Filed May 11, 1934
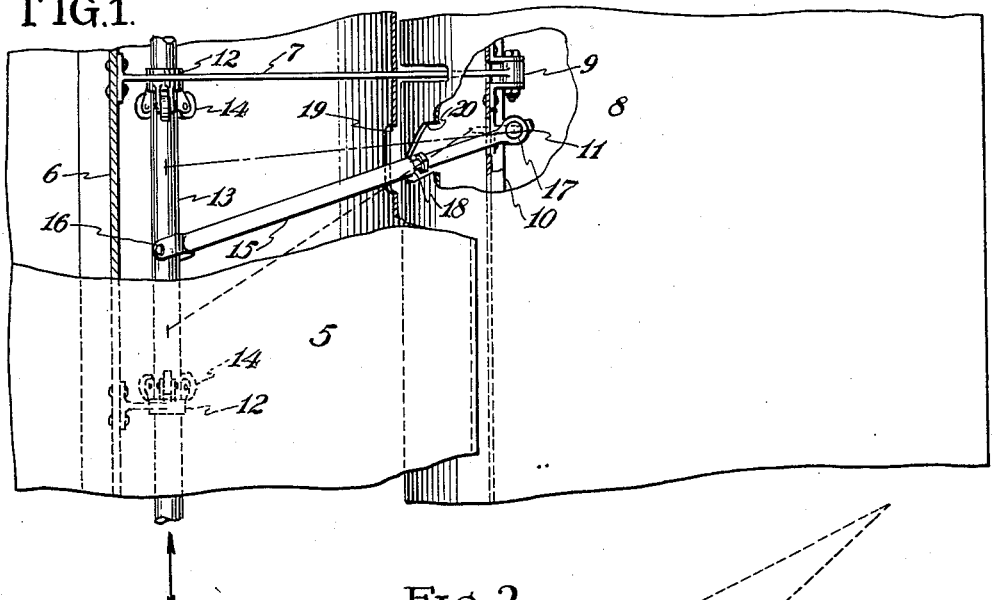
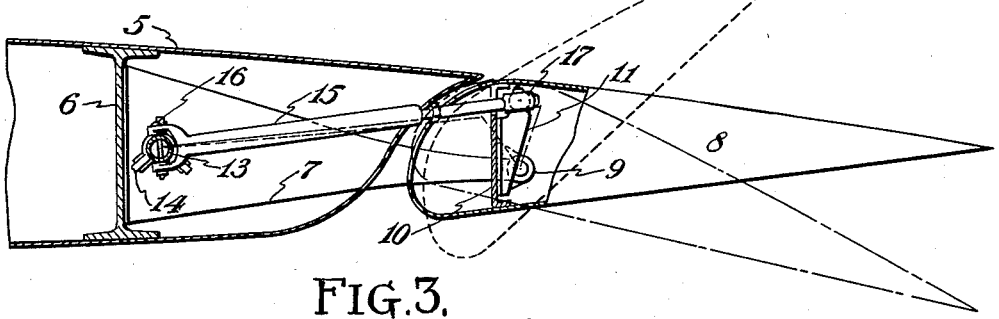
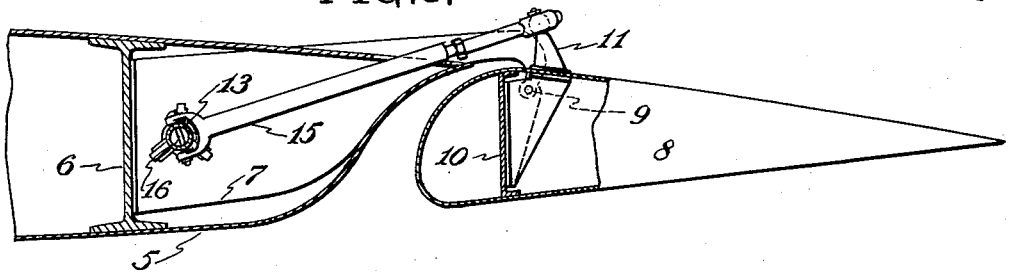
INVENTOR.
LEONARD O. CEDERWALL.
BY
ATTORNEYS.

Patented Sept. 1, 1936

2,053,064

UNITED STATES PATENT OFFICE

2,053,064

AILERON CONTROL

Leonard O. Cederwall, Kenmore, N. Y., assignor to Curtiss Aeroplane & Motor Company, Inc., a corporation of New York Application May 11, 1934, Serial No. 725,140

8 Claims. (Cl. 244—29)

This invention relates to aircraft control systems, and is particularly concerned with improvements in operating mechanisms for ailerons.

In conventional aileron control systems, wherein the ailerons are mounted toward the outer ends of the main wings, cables are sometimes used, running over pulleys, to transmit motion of the control stick to the ailerons. Also, push-pull rods are sometimes used to connect the stick will bell cranks near the ailerons, which bell cranks, in turn, are connected to the ailerons. The latter construction lends itself to differential aileron action whereby the aileron moves upwardly to a greater extent than it moves down, but a plurality of bearings, pivots and the like are necessary to accomplish the intended result. All these pivots and bearings give an opportunity for play and lost motion which is most objectionable, and such construction does not inherently lend itself to extreme light weight.

This invention consists generally in a push-pull tube within the wing, moved under the influence of the control stick, and guided for axial translation by suitable rollers. The aileron, hinged to the wing trailing edge, is provided with the usual horn or operating lever, the horn being directly connected by a diagonal push-pull member to the push-pull tube. In all positions of aileron adjustment, the diagonal member makes an acute angle with the push-pull tube. By pushing or pulling said tube, the diagonal member's angle thereto is changed, and, since the length of the member is constant, the aileron horn must necessarily move toward or away from the tube, thus raising or lowering the aileron. If in the neutral aileron position the diagonal member makes an angle of about 70° with the tube, when the angle is increased by sliding the tube, the aileron is moved only a small amount; conversely, when the angle is decreased, the aileron is moved a relatively large amount. This allows of automatic differential operation of the ailerons— the decrement in the angle mentioned is applied in raising the aileron and the increment is applied in lowering the aileron.

Objects of the invention are to provide a simple operating mechanism for aircraft control surfaces; to provide a mechanism free from a large number of pivots and hinge joints; to provide a mechanism which by its inherent design may be made light in weight; and to provide a simple, light weight mechanism for effecting differential aileron control.

Further objects will become apparent in reading the specification and in examining the drawing, in which:

Fig. 1 is a plan of a portion of a wing and aileron, partly broken away;

Fig. 2 is a section through the wing and aileron, showing the aileron operating mechanism; and Fig. 3 is a section similar to Fig. 2, showing a different arrangement of certain of the operating mechanism elements.

A wing 5 includes the usual wing spar 6, from which a bracket 7 extends rearwardly to a point near to the wing trailing edge, the bracket carrying an aileron 8 on a hinge 9. As is well known in the art, a plurality of such brackets and hinges are spaced along the wing to support the aileron at a plurality of points. These hinges are so arranged that the aileron may swing upwardly or downwardly about the hinge to effect lateral control. One or more ailerons are organized at each side of the plane of symmetry of the aircraft and are arranged so that the ailerons on one side move up, while those on the opposite side move down, and vice versa. The aileron 8 includes a spar 10 mounted on the hinges 9, said spar forming the main structural element of the aileron, and a horn or lever 11 is mounted on said spar, the end of the horn being spaced from the axis of the hinge 9, whereby forward or rearward movement of the upper end of the horn may move the aileron upwardly or downwardly.

Fig. 2 shows the hinge 9 near the bottom surface of the aileron, with the upper end of the horn 11 within the confines thereof, so that no projections extend into the airstream. Fig. 3 shows an alternative construction wherein the hinge 9 is located adjacent the upper surface of the aileron, the horn 11 projecting above said upper surface.

Within the wing 5 and attached to the rearward face of the spar 6, are a plurality of guides 12—12 within which a push-pull tube 13 is arranged to slide in a direction parallel to the wing spar. Suitable means well known in the art are provided at the inner end of the push-pull tube 13 for controlled movement thereof. The guides 12 are provided with a plurality of rollers 14 which allow the tube 13 to slide freely through the guides with a minimum of friction. The tube 13 and the horn 11 are joined by a link 15, said link having a pivotal connection 16 with the tube 13, and having a universal ball connection 17 with the upper end of the horn 11. This link 15 is of such a length that, when the aileron is in its neutral position as shown in solid lines, the link will make an acute angle with the tube 13, said angle being on the order of about 70°. When the tube 13 is drawn inwardly, the angle between the link 15 and the tube will be increased, since the joint 17 may not move laterally. Thereby, the projected length of the link 15 on a line normal to the tube 13 and intersecting the joint 17 must increase, whereupon the aileron is swung downwardly about the hinge 9. Conversely, when the tube 13 is pushed outwardly, the angle between the link 15 and the tube 13 is decreased, causing the aileron to be pulled to an upward position. In Figs. 1 and 2, the dot and dash lines represent the position of the link 15 and aileron when the aileron is depressed. The dotted lines in Figs. 1 and 2 represent the link and aileron, respectively, when moved to an up position. It will be seen that the link 15 in any position of adjustment, always makes an acute angle with the tube 13, and no dead center position may be reached. This organization inherently causes the aileron to have an upward angular movement greater than the downward angular movement thereof, each from the neutral position, even though the translational movement of the tube 13 may be equal from the neutral position. This, of course, is due to the fact that the projection of the link 15 on a line normal to the tube 13 varies in a non-uniform manner with translational movement of the tube 13. Inherently, then, differential action of the aileron accures, which is most desirable. In the prior art, many more complicated mechanisms have been used to attain this differential action, whereas in this embodiment, such action is automatically attained by the extremely simple organization of the aileron actuating mechanism. Obviously, when the tube 13 is connected with a similar tube on the opposite side of the aircraft, through the medium of a suitable control stick, opposite movement of the ailerons is attained when the control stick is moved. The degree of differential action of the aileron above the neutral plane and below the neutral plane may be easily determined by the location of the link pivot 16. In order to provide for adjustment of aileron position, the link 15 may be constructed with a screw connection 18 similar to a turnbuckle. Slots 19 and 20 of suitable conformation are formed in the trailing edge of the wing and the leading edge of the aileron, respectively, so that the link 15 may have a free path of movement through the airfoil surfaces.

When the control system of this invention is used for aileron control, the link 15 should preferably make less than a right angle with the push-pull tube 13 in all positions, to avoid dead centers. When the system is used, as it may readily be, for the actuation of lift increasing wing flaps, the link 15 might preferably be arranged to move past a right angled position relative to the push-pull tube. Thereby, the flap would be irreversibly locked in the down attitude until control effect is exerted on the tube 13.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. Control means for an aileron transversely hinged to the trailing edge of a wing including a push-pull rod extending laterally within the wing, a push-pull member pivoted to said rod and extending rearwardly therefrom, a horn spaced from the aileron hinge axis, and pivot connection between said horn and the rearward end of said member.

2. In an aileron control mechanism for an aileron hinged to a wing, an aileron horn having a terminal spaced from the hinge axis, a push-pull control rod substantially parallel to the aileron hinge axis and forwardly spaced therefrom, and a single push-pull member pivoted to said push-pull rod and to said horn terminal.

3. In an aileron control mechanism for an aileron hinged to a wing, an aileron horn having a terminal spaced from the hinge axis, a push-pull control rod substantially parallel to the aileron hinge axis and forwardly spaced therefrom, and a single push-pull member pivoted to said push-pull rod and to said horn terminal, said member in all positions of adjustment making an acute angle with the axis of said rod.

4. In a control system, a wing, a push-pull rod axially movable therein, guide means for constraining said rod to axial movement, a flap hinged to said wing, a pivot carried by said flap, said pivot being spaced from the flap hinge axis, and a single push-pull member pivoted at its ends to said rod and to said flap pivot and making at all times an acute angle with said rod axis and with the plane of the locus of said flap pivot.

5. In an aircraft control system including an axially translatable control rod and an element movable along a line substantially normal to the line of said rod movement, means for moving said element in response to movement of said rod comprising a single push-pull member pivoted at its ends to said rod and to said element and making an acute angle with said rod axis and with the plane of movement of said element.

6. In an aircraft control system including an axially translatable control rod and an element movable along a line substantially normal to the line of said rod movement, means for moving said element in response to movement of said rod comprising a single push-pull member pivoted at its ends to said rod and to said element, said member in all positions of adjustment of said rod making an acute angle therewith with the axis thereof.

7. In an aircraft control system including a control rod movable axially and a lever having a fulcrum axis substantially parallel to said rod axis, means for moving said lever about its fulcrum in response to axial movement of said rod comprising a connecting member pivoted to both said lever and to said rod, said member, throughout the normal range of movement of said system, making acute angles of varying degree with said rod axis.

8. In a control system including a flap hinged to a wing, a control rod axially movable within said wing, said flap being hinged to said wing on a hinge axis spaced from and substantially parallel to said rod, a ball pivot carried by said flap in spaced relation above said hinge axis, and a push-pull member pivoted at one end to said rod and having a length somewhat greater than the minimum distance between said rod and said ball pivot, said member having a socket at its opposite end engaging said ball pivot, whereby movement of said rod translates the corresponding end of said member to effect movement of said ball pivot about said flap hinge axis.

LEONARD O. CEDERWALL.